United States Patent [19]

Williams, Jr.

[11] Patent Number: 5,009,444
[45] Date of Patent: Apr. 23, 1991

[54] SLIDEABLE JACK STAND

[76] Inventor: Thomas M. Williams, Jr., 2310 Old Oxford Hwy., Durham, N.C. 27704

[21] Appl. No.: 410,370

[22] Filed: Sep. 21, 1989

[51] Int. Cl.⁵ .............................................. B60D 1/00
[52] U.S. Cl. .................................... 280/477; 254/420; 254/DIG. 1
[58] Field of Search ............... 280/477, 478.1, 475; 384/42; 254/420, DIG. 1

[56] References Cited

U.S. PATENT DOCUMENTS

| 3,084,953 | 4/1963 | McGregor | 280/477 |
| 3,329,402 | 7/1967 | Grumman | 254/420 |
| 3,765,703 | 10/1973 | Voelkerding et al. | 280/475 X |
| 3,807,767 | 4/1974 | Moline | 280/477 |
| 4,431,208 | 2/1984 | Geeves | 280/477 |
| 4,537,416 | 8/1985 | Linaburg | 280/478 |
| 4,784,068 | 11/1988 | Burke | 384/42 X |
| 4,911,460 | 3/1990 | DePaula | 280/478.1 |

Primary Examiner—Charles A. Marmor
Assistant Examiner—Mitchell Bompey
Attorney, Agent, or Firm—Olive & Olive

[57] ABSTRACT

A trailer hitch device comprises a jack shaft receiving socket mounted on a ground engaging support and slideable on a very low friction surface thus enabling the jack shaft to be shifted to perfect alignment of the components of a trailer hitch.

8 Claims, 6 Drawing Sheets

SLIDEABLE JACK STAND

BACKGROUND OF INVENTION

1. Field Of The Invention

The invention relates to trailer hitch alignment devices and more particularly to devices which enable the jack shaft and trailer tongue to be shifted to permit alignment of a trailer tongue and a trailer hitch.

2. Background Art

The tongue of a recreational trailer such as a camping trailer, a travel trailer or a boat trailer is typically supported by a jack at the campsite. The jack shaft is manually supported either by a pivoted wheel mounted on the lower end of the jack shaft or by some kind of block placed on the ground. A tongue weight of 500 to 1500 pounds, more or less, is supported by the jack shaft. When it becomes time to hitch the trailer to the towing vehicle, the hitch component on the trailer must be aligned with the corresponding hitch component on the tow vehicle. At this stage it is often desirable to be able to shift the trailer tongue sidewise relative to the tow vehicle to perfect alignment. However, such shifting is not readily achieved when the jack shaft is supported by a wheel or by a block.

U.S. Pat. No. 4,537,416 discusses the foregoing alignment problem and illustrates a rocking device for rocking the trailer tongue into position by use of a lever applied to the rocking device. Sofar as applicant is aware, the alignment device shown in U.S. Pat. No. 4,537,416 has never been marketed.

The automatic trailer hitch of U.S. Pat. No. 4,560,184 has further identified the need for an improved alignment device capable of aligning both a conventional ball and socket type hitch as well as aligning the hitch components of an automatic trailer hitch such as shown in U.S. Pat. No. 4,560,184.

With the foregoing in mind, the present invention is aimed at providing a device for supporting a jack shaft in a manner which enables the tongue to be easily shifted by simply sliding the jack shaft on the device of the invention. Other objects and features of the invention will become apparent as the description proceeds.

SUMMARY OF THE INVENTION

The alignment device of the invention basically comprises a jack shaft receiving socket mounted on a ground engaging support and slideable on a very low friction surface relative to the ground engaging support. Alignment of the trailer coupling to the hitch is readily accomplished when the weight of the trailer tongue is on the jack shaft simply by sliding the jack shaft relative to the ground engaging support which is illustrated both in the form of a ground engaging block structure and a ground engaging stand. Means for locking the invention device in a fixed position is also illustrated.

DESCRIPTION OF PREFERRED EMBODIMENT

Making reference to the drawings, three embodiments are illustrated and operate in essentially the same way. The three embodiments differ primarily in the form of the ground support with one form of ground support according to the first embodiment being shown in FIGS. 1-14, another form of ground support according to a second embodiment being shown in FIGS. 15-21 and another form according to a third embodiment being shown in FIGS. 22-26.

Figure 1:
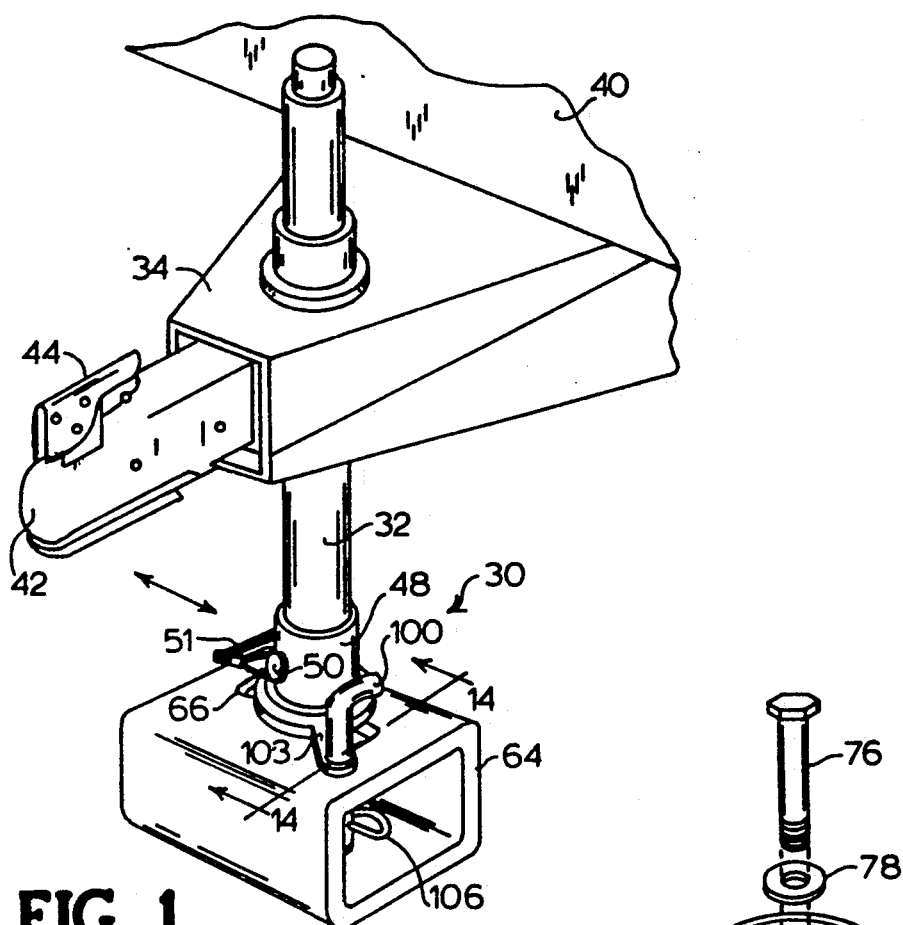
FIG. 1 is a perspective view illustrating a first embodiment of the invention alignment device in a locked position and supporting a trailer jack shaft.

Making reference to the first embodiment shown in FIGS. 1–14 and initially to FIG. 1, there is shown in FIG. 1 an overall view of the invention device 30 supporting a jack shaft 32 forming part of a trailer tongue jack, only partially illustrated, secured to a tongue 34 of a towed vehicle 40 in the nature of a travel trailer, boat trailer, camping trailer or the like. Tongue 34 mounts a conventional ball receiving hitch member 42 and conventional ball latch 44.

Figure 2:
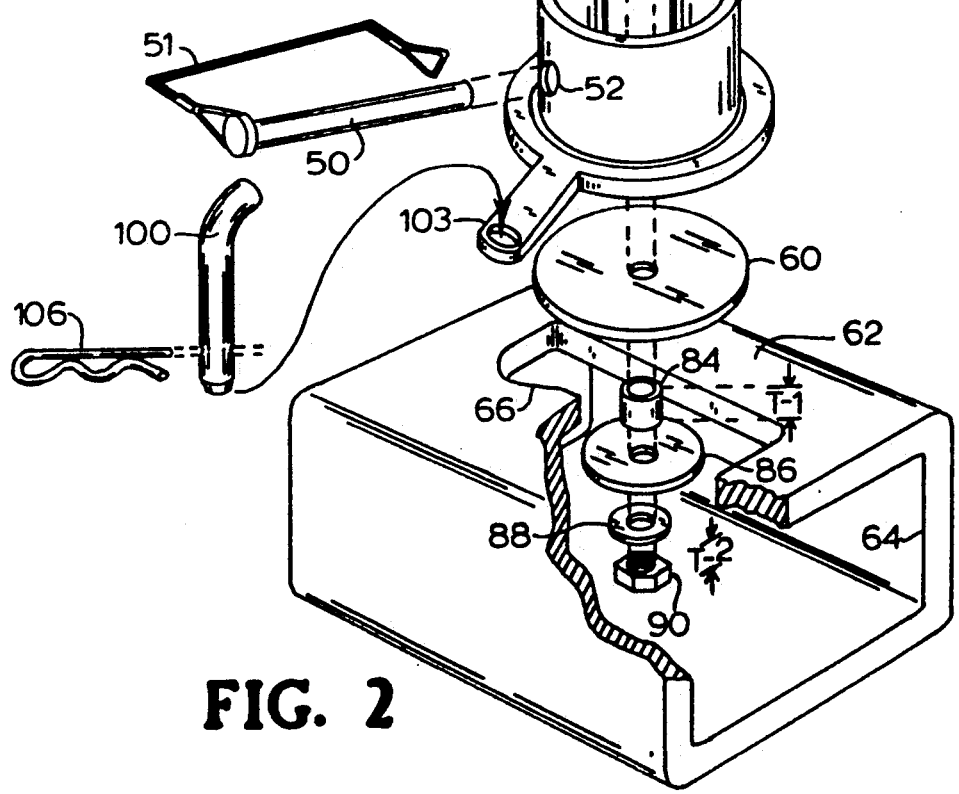
FIG. 2 is an exploded view of the first embodiment components.
Figure 3:
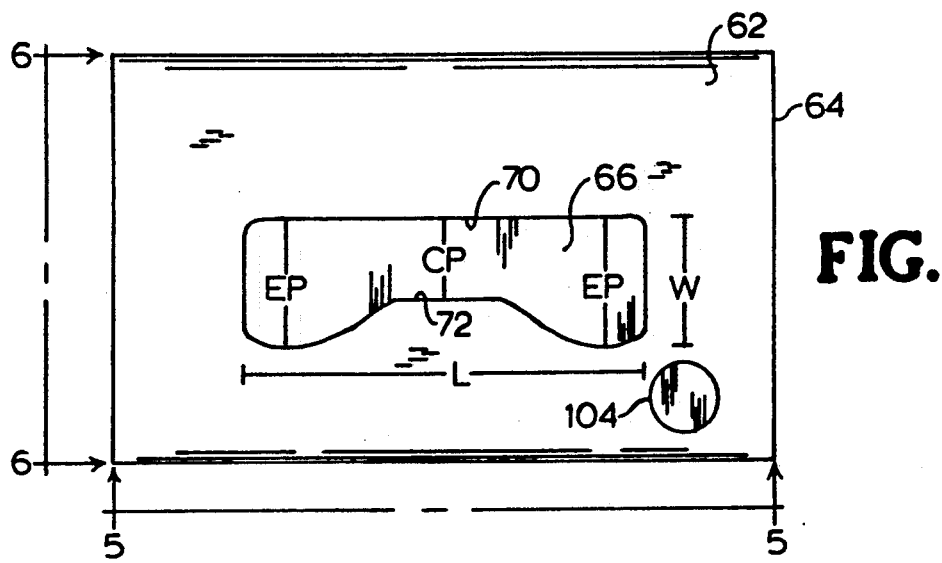
FIG. 3 is a top view of the ground support block shown in FIG. 2.
Figure 4:
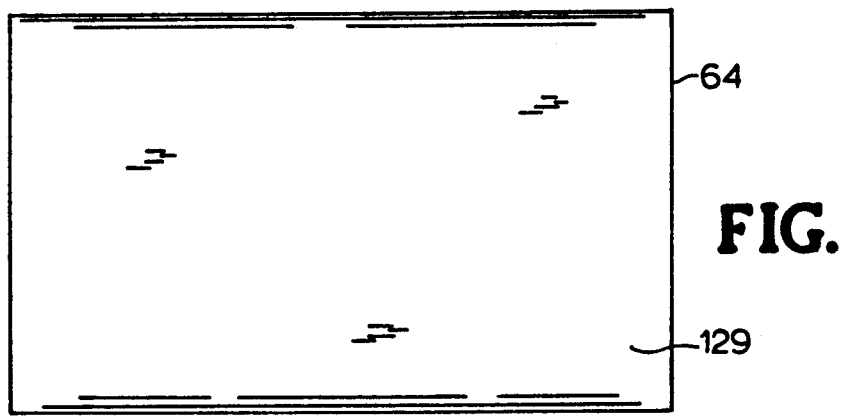
FIG. 4 is a bottom view of the ground support block shown in FIG. 2.
Figure 5:
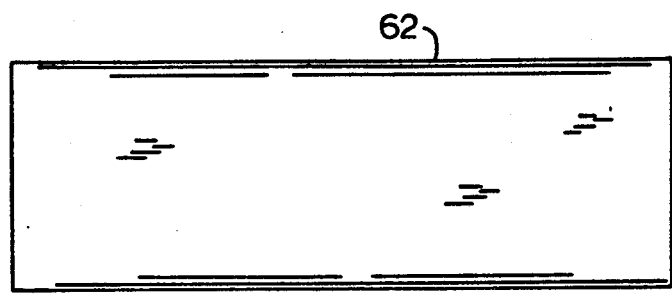
FIG. 5 is a side view of the ground support block shown in FIG. 2 taken in the direction of line 5—5 of FIG. 3.
Figure 6:
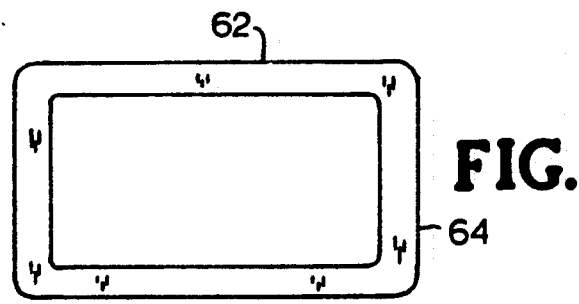
FIG. 6 is an end view of the ground support block shown in FIG. 2 taken in the direction of line 6—6 of FIG. 3.
Figure 7:
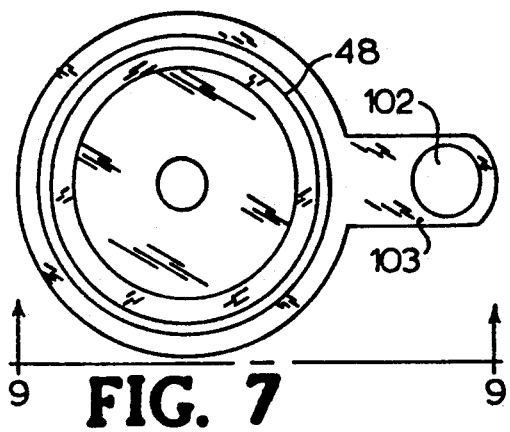
FIG. 7 is a top view of the jack shaft receiving socket shown in FIG. 2.
Figure 8:
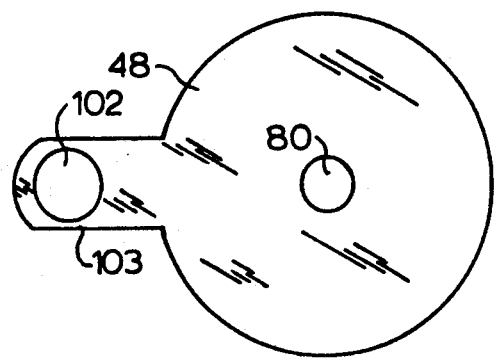
FIG. 8 is a bottom view of the jack shaft receiving socket shown in FIG. 2.
Figure 9:
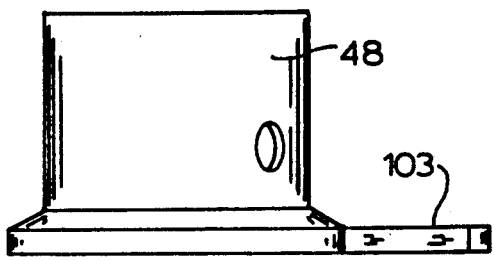
FIG. 9 is a side view of the jack shaft receiving socket shown in FIG. 2 taken in the direction of line 9—9 of FIG. 7.
Figure 10:
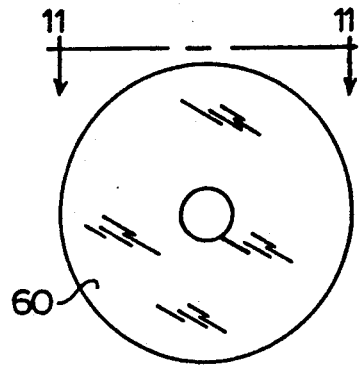
FIG. 10 is a plan view of a low friction washer used to support the jack shaft receiving socket on the ground support block.
Figure 11:
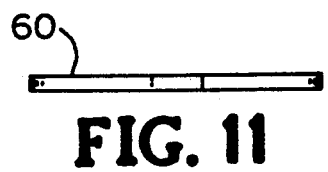
FIG. 11 is a side view of the washer shown in FIG. 10 taken in the direction of line 11—11 of FIG. 10.
Figure 12:
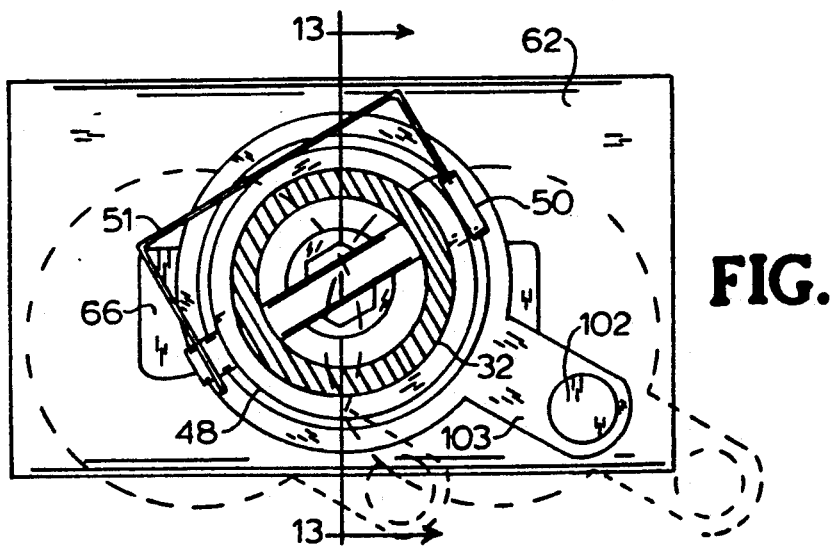
FIG. 12 is a top view of the assembled device of the first embodiment in a first unlocked position shown in solid lines and laterally shifted unlocked positions shown in dashed lines.
Figure 13:
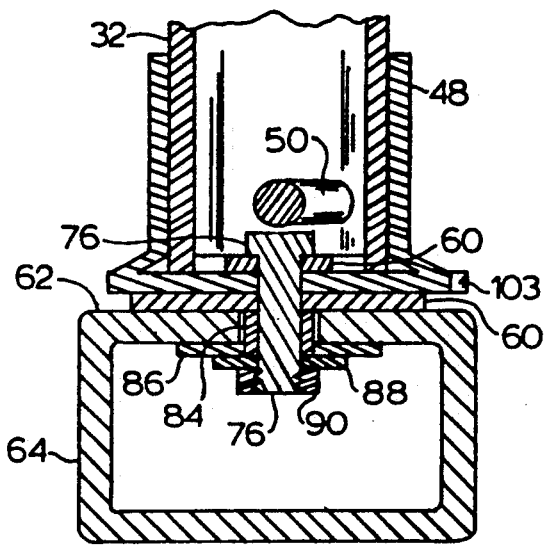
FIG. 13 is a section view taking in the direction of line 13—13 in FIG. 12.
Figure 14:
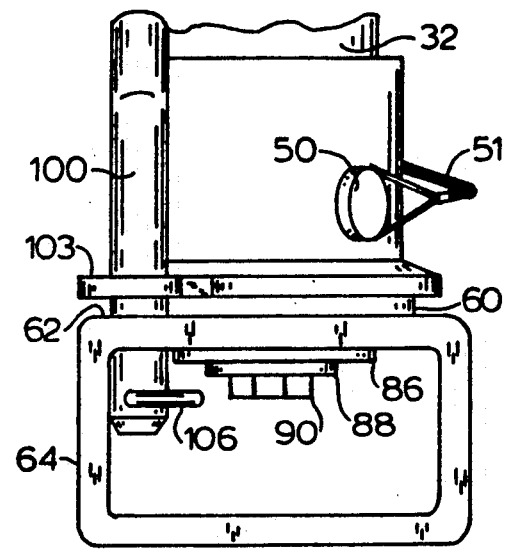
FIG. 14 is an end view of the first embodiment of the invention device with a locking pin installed for a parked position of the trailer.
Figure 15:
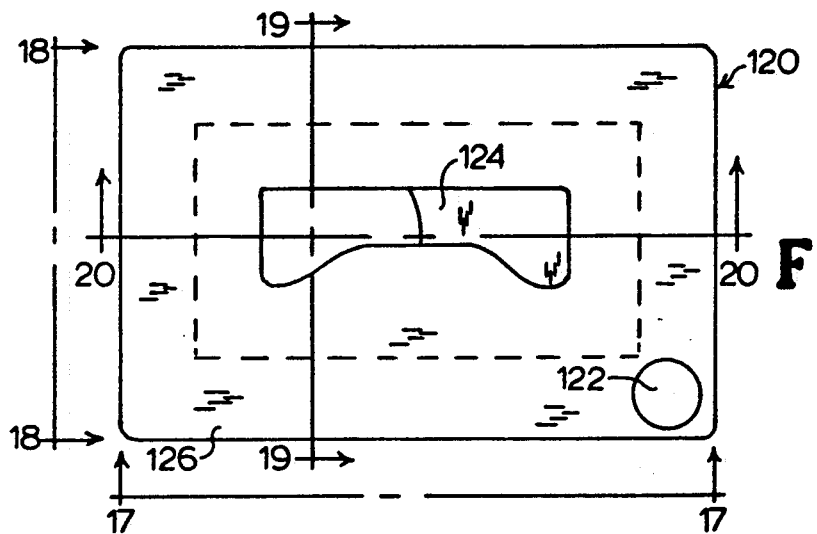
FIG. 15 is a top view of a ground support block according to a second embodiment.
Figure 16:
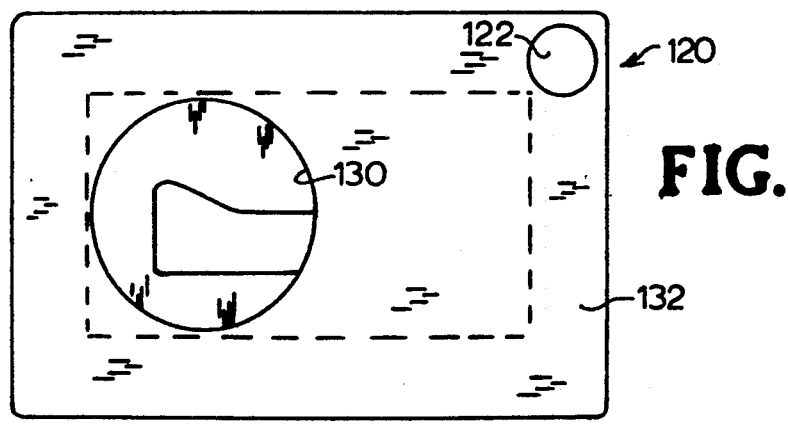
FIG. 16 is a bottom view of the ground support block according to the second embodiment.
Figure 17:
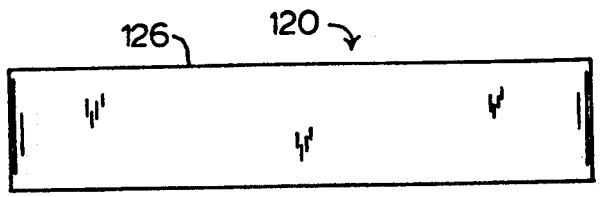
FIG. 17 is a side view of the ground support block according to the second embodiment taken in the direction of line 17—17 of FIG. 15.
Figure 18:
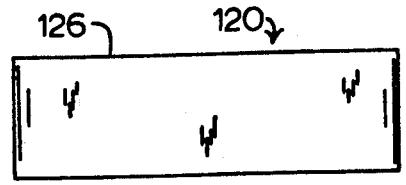
FIG. 18 is a end view of the ground support block according to the second embodiment taken in the direction of line 18—18 of FIG. 15.
Figure 20:
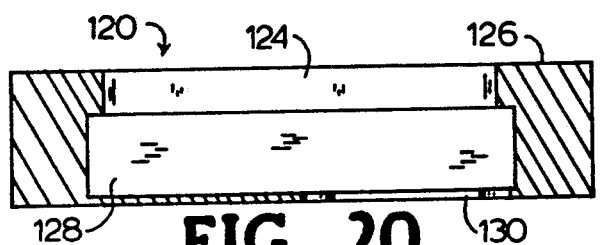
FIG. 20 is a section view taken in the direction of line 20—20 of FIG. 15.
Figure 19:
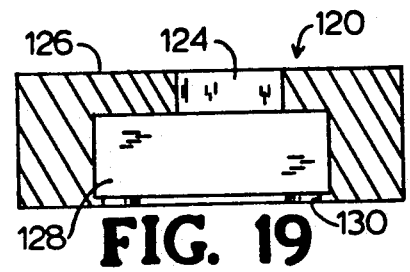
FIG. 19 is a section view taken in the direction of line 19—19 of FIG. 15.
Figure 21:
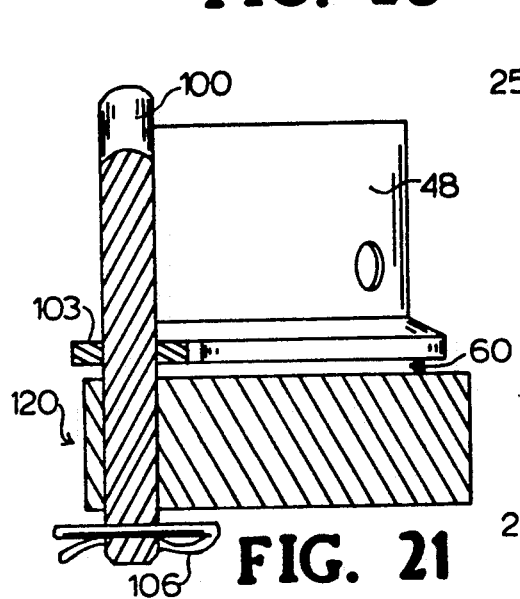
FIG. 21 is a section view taken with the ground support block of the second embodiment assembled with the jack shaft receiving socket and shown with a locking pin in place.
Figure 22:
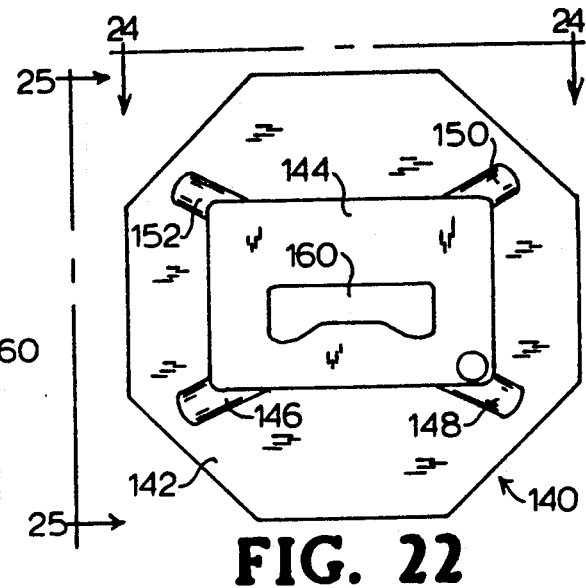
FIG. 22 is a plan view of a third embodiment ground support stand.
Figure 24:
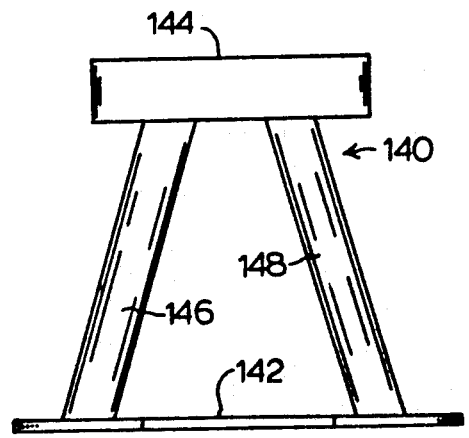
FIG. 24 is a side view of the ground support stand of FIG. 22 taken in the direction of line 24—24 of FIG. 22.
Figure 23:
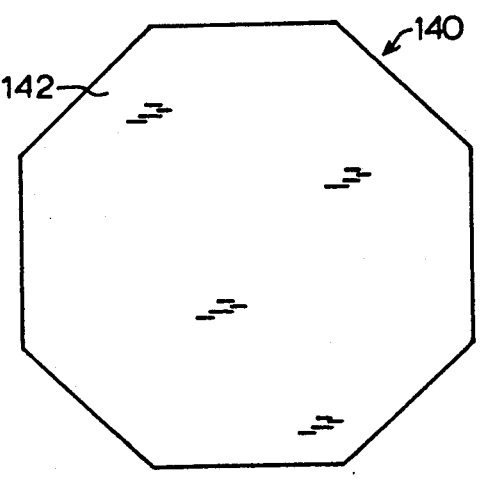
FIG. 23 is a bottom view of the ground support stand of FIG. 22.
Figure 25:
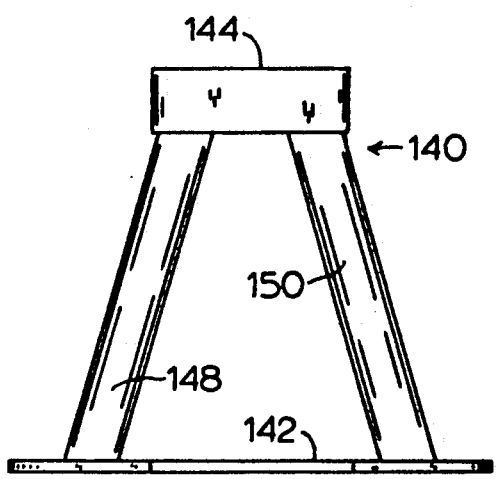
FIG. 25 is an end view of the ground support stand of FIG. 22 taken in the direction of line 25—25 of FIG. 22.

Jack shaft 32 is received by a socket member 48 to which it is releaseably secured by a latch pin 50 fitted with a locking clip 51 and pass through mating holes formed in the bottom end of jack shaft 32 and socket member 48. One such pin receiving hole 52 is illustrated in FIG. 2. Socket member 48 mounts on a low friction washer 60 formed of Teflon material or any like low friction material and which slides on the preferably smooth polished top wall 62 of ground support block 64. In an alternative embodiment, the lower surface of socket member 48 or the top surface of wall 62 or both may be coated with a low friction coating thus eliminating the need for the low friction washer 60. Ground support block 64 is formed of hollow steel channel and in the top wall 62 is shaped with a slot 66 having a straight trailing edge 70 and a leading partially curved edge 72 establishing a relatively narrow central passage CP and relatively wider end passages EP at the end of the slot. Device 30 in use is positioned so that edge 70 is adjacent the trailer side of the hitch and edge 72 is adjacent the towing vehicle side of the hitch. The following dimensions were employed in one embodiment in reference to FIG. 3. L equalled 3½ inches, W equalled 1¾ inches, and the width of central passage CP equalled ¾ inches. Bolt 76 had a ½ inch. In use, it has been found that when both trailer wheels are chocked, the slot shape shown in FIG. 3 minimizes any tendency of the ground support block 64 to slide on the ground all of which will be better understood as the description proceeds.

Bolt 76 is received by an optionally employed flat washer 78 and passes through a central hole 80 (FIG. 8) formed in socket member 48. The shaft of bolt 76 is also received by a cylindrical bushing 84 which acts as a bearing for bolt 76 riding in slot 66. Bushing 84 preferably has a thickness T-1 equal to the slot wall thickness T-2 as best seen in FIG. 2 and is retained by a flat washer 86 of larger size, an optionally employed small washer 88 and a lock nut 80.

From what has thus far been explained, it will be understood that when the full tongue weight of the trailer is supported by jack shaft 32 and the lower end of jack shaft 32 is supported in the socket member 48, the full weight of the trailer tongue is supported on the invention device 30. Locking of device 30 when the trailer 40 is parked is accomplished by means of a locking pin 100 which mates a hole 102 formed in locking tab 103 appended to jack shaft receiving socket 48 and another hole 104 (FIG. 3) in top wall 62 which can be mated with tab hole 102. Thus, when holes 102 and 104 are mated, locking pin 100 can be installed as in FIG. 1 and retained by a suitable removable clip 106 as in FIG. 14 thus permitting the trailer 40 to be parked without any tendency of the tongue 34 to move relative to the ground. In such parked position, the receiving socket 48 is located centrally of the device 30. Hole 104 is located so as to be on the driver's side of the towing vehicle and thus readily accessible.

Use of the device 30 is accomplished when jack shaft 32 is installed in the receiving socket 48 as in FIG. 1 and it is desired to align the ball socket 42 with a trailer hitch ball not shown, and there is a need to shift the ball socket 42 to one side or the other. In this event, locking pin 100 is removed and simply by pushing on the trailer tongue 34, the receiving socket 48 and thus jack shaft 32 are moved accordingly to a new alignment position as in FIG. 12 for example. Once the hitch components are aligned, the jack, not shown, is operated to bring ball socket 42 in full engagement with the trailer hitch ball after which the jack can be raised and the device 30 removed by removing pin 50 and then stored for transit until needed again at the end of travel. In an alternative application, the invention device 30 may also be employed when desired to assist in the alignment of automatic trailer hitch components such as shown in U.S. Pat. No. 4,560,184.

The second embodiment, FIGS. 15–21, and the third embodiment, FIGS. 22–26, differ from the first embodiment only in the form of the ground support. Referring next to FIGS. 15–21, the second embodiment ground support comprises a ground support block 120 having a locking pin receiving hole 122 which passes through block 120. A slot 124 having a shape similar to that of slot 66 is formed in top wall 126 and communicates with an interior cavity 128. An opening 130 in the bottom wall 132 permits insertion and assembly of the previously described flat washer 86, washer 88 and nut 88 on bolt 76.

Figure 26:
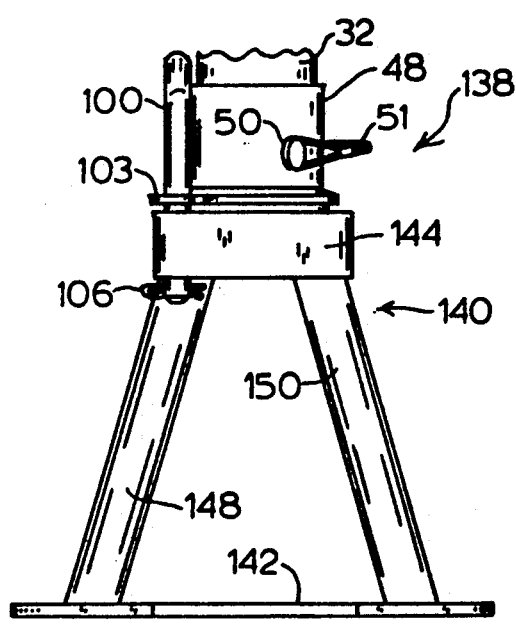
FIG. 26 is a side view of the ground support stand of FIG. 22 assembled with a jack shaft receiving socket and with the locking pin in place and with the jack shaft installed.

The third embodiment alignment device 138, illustrated in FIGS. 22–26, provides a welded together steel stand having a relatively thin bottom ground engaging plate 142 joined to a relatively thick top jack shaft supporting plate 144 by four angled legs 146, 148, 150, and 152. Top plate 144 is formed with a slot 160 shaped in the form of previously described slot 66 shown in FIG. 3. In use, the stand 140 is assembled with the jack shaft receiving socket 48 as seen in FIG. 26 and for parking receives locking pin 100 as shown in FIG. 26. However, when it is desired to align the ball socket 42 with the ball on a towing vehicle hitch, locking pin 100 is removed and socket 48 is made to slide on top of plate 144 in the manner previously explained.

In summary, the invention provides an extremely simple trailer hitch alignment device which eliminates the use of levers and is operable with a minimum of effort. Further, the invention device is easily removed and stored for transit and is easily assembled when needed for alignment or parking purposes or both.

What is claimed is:

1. A trailer hitch alignment device comprising:
   (a) a ground support structure providing an elevated flat horizontal wall;
   (b) a socket member opening upwardly of said wall and having a base portion dimensioned to receive a lower end of a conventional trailer jack shaft;
   (c) means for supporting said socket member on said wall and providing a substantially low friction sliding support; and
   (d) means for guiding and limiting travel of said socket member on said wall to permit limited lateral and longitudinal sliding movement of said jack shaft when mounted in said socket member comprising:
      (i) an elongated guide slot formed in said wall and providing a vertical passage therethrough bounded by a continuous flat, vertical edge, said edge being shaped so as to make a middle of the passage relatively narrow and ends of the passage relatively wide; and (ii) a guide member secured to said socket member base portion and passing through said low friction sliding support and said passage, said guide member being operative by contacting said edge to permit both limited lateral and longitudinal sliding of said socket member and said jack shaft mounted therein on said wall as required to facilitate trailer hitch alignment.

2. A trailer hitch alignment device comprising:

(a) a ground support structure providing an elevated flat horizontal wall;

(b) a socket member opening upwardly of said wall and being dimensioned to receive a lower end of a conventional trailer jack shaft;

(c) means for supporting said socket member on said wall and providing a substantially low friction sliding support; and (d) means for guiding and limiting travel of said socket member on said wall to permit corresponding limited lateral and longitudinal sliding movement of said jack shaft when mounted in said socket member comprising:

(i) an elongated guide slot forming a vertical passage through said wall and having a substantially straight trailing edge and a leading edge contiguously connected together by a pair of substantially straight end edges of substantially equal length, one at each respective end of said slot, said leading edge being shaped with a substantially straight middle section and outwardly curved sections on opposite sides of said middle section to make the slot relatively wide at each of its ends and relatively narrow adjacent said middle section; and (ii) guide means attached to said socket member and extending through said sliding support means and said slot, said guide means being adapted to travel through both said relatively narrow and relatively wide portions of said slot and to be guided and permitted both lateral and longitudinal movement by sliding contact with the edges of said slot thereby enabling said socket member and a trailer jack shaft mounted thereon to have corresponding sliding movement.

3. A trailer hitch alignment device as claimed in claim 2 including means for releasably locking said socket member in a fixed position on said wall.

4. A trailer hitch alignment device as claimed in claim 2 wherein said ground support structure comprises a hollow block structure resting on the ground.

5. A trailer hitch alignment device as claimed in claim 2 wherein said ground support structure comprises a stand having a lower ground engaging plate and an upper plate supported by legs extending between the upper and lower plates and said upper plate includes said wall and said means for limiting said travel.

6. A trailer hitch alignment device as claimed in claim 2 wherein:

(a) said low friction sliding support comprises a washer formed of low friction material; and (b) said means for guiding and limiting travel of said socket member comprising said guide means includes fastening means having a shaft connected to said socket member and passing through said guide slot formed in said wall.

7. A trailer hitch alignment device as claimed in claim 6 wherein said fastening means comprises a bolt having a head portion resting within said socket member and the lower end of said jack shaft, a bushing residing in said slot and through which said bolt shaft passes and a nut for retaining said bolt appropriately positioned.

8. A trailer hitch alignment device as claimed in claim 2 wherein said low friction sliding support comprises a washer formed of low friction material.

* * * * *